United States Patent
Pursifull et al.

(10) Patent No.: US 8,151,771 B2
(45) Date of Patent: Apr. 10, 2012

(54) FUEL PREHEAT FOR ENGINE START

(75) Inventors: Ross Dykstra Pursifull, Dearborn, MI (US); Joseph Norman Ulrey, Dearborn, MI (US)

(73) Assignee: Ford Global Techologies, LLC, Dearborn, MI (US)

( * ) Notice: Subject to any disclaimer, the term of this patent is extended or adjusted under 35 U.S.C. 154(b) by 610 days.

(21) Appl. No.: 12/332,154

(22) Filed: Dec. 10, 2008

(65) Prior Publication Data
US 2010/0139628 A1 Jun. 10, 2010

(51) Int. Cl.
*F02F 31/00* (2006.01)

(52) U.S. Cl. ............... 123/557; 123/549; 123/179.21

(58) Field of Classification Search ............ 123/557, 123/549, 179.21
See application file for complete search history.

(56) References Cited

U.S. PATENT DOCUMENTS

| | | | | |
|---|---|---|---|---|
| 3,989,019 A | * | 11/1976 | Brandt et al. | 123/557 |
| 4,553,697 A | * | 11/1985 | Nothen et al. | 237/12.3 B |
| 5,411,005 A | * | 5/1995 | Bohl et al. | 123/557 |
| 5,611,392 A | * | 3/1997 | Malecek et al. | 165/47 |
| 6,119,637 A | | 9/2000 | Matthews et al. | |
| 6,227,151 B1 | | 5/2001 | Ma | |
| 6,340,003 B1 | | 1/2002 | Schoubye et al. | |
| 6,371,094 B1 | | 4/2002 | Wagner | |
| 6,626,162 B2 | * | 9/2003 | Shelor et al. | 123/541 |
| 6,839,508 B2 | * | 1/2005 | Biess et al. | 392/462 |
| 2006/0254133 A1 | | 11/2006 | Rudolph et al. | |
| 2007/0062496 A1 | * | 3/2007 | Snower et al. | 123/549 |
| 2009/0133676 A1 | * | 5/2009 | Lepsch et al. | 123/549 |
| 2010/0024784 A1 | * | 2/2010 | Lin | 123/557 |
| 2010/0242926 A1 | * | 9/2010 | Biddulph | 123/549 |

FOREIGN PATENT DOCUMENTS
EP 1350944 10/2003

* cited by examiner

*Primary Examiner* — M. McMahon
(74) *Attorney, Agent, or Firm* — Allan J. Lippa; Alleman Hall McCoy Russell & Tuttle LLP

(57) ABSTRACT

Systems and methods for providing heated fuel to a fuel injector of an engine are provided. According to the approaches described herein, adequate cold-start fuel atomization may be provided without compromising driver satisfaction due to excessive pre-ignition delay, while at the same time reducing unnecessary heating of fuel during warm engine off conditions.

13 Claims, 7 Drawing Sheets

FUEL PREHEAT FOR ENGINE START

TECHNICAL FIELD

The present application relates to the fields of motor-vehicle fuel systems and motor-vehicle emissions control.

BACKGROUND AND SUMMARY

Emissions-control performance in a motor-vehicle engine system depends on effective atomization of the liquid fuel. When fuel entering the combustion chamber of an engine is inadequately atomized, increased hydrocarbon and/or other emissions may result. This effect may be especially evident shortly after a cold start of the engine, when the fuel and the engine are both cold. Moreover, ignition of the fuel under cold-start conditions may be unreliable when the fuel is inadequately atomized.

Achieving adequate cold-start fuel atomization may be especially difficult in a gasoline direct-injection (GDI) engine, where the air/fuel mixing interval is short, and in engines where high surface-tension, low-volatility alcohol fuels are used in place of gasoline. It is known, however, that a heated fuel may be atomized more easily than a cold fuel. Approaches for improving cold-start fuel atomization have therefore included heating the fuel as soon as a cold start is requested, e.g., when a driver of the motor vehicle turns the ignition key. The fuel may be heated via one or more resistively heated engine elements—injection impingement plates, ports, injectors, for example. Alternatively, the fuel may be heated via the combustion air.

These approaches all share a common feature: a wait-to-start interval beginning when the cold-start is requested and continuing until a liquid or solid body has reached a given temperature. By delaying ignition until after the wait-to-start interval, a disadvantageous trade-off between motor-vehicle cost and driver satisfaction may be manifest. Specifically, driver satisfaction may require a short wait-to-start interval, so that ignition occurs promptly after the cold-start request. But a short wait-to-start interval may require significant power-delivery from fuel-heating engine elements, resulting in increased motor-vehicle cost.

The inventors herein have recognized the disadvantages noted above and have provided an approach to address this paradox. In one embodiment, a method for providing heated fuel to a fuel injector of an engine is provided. The method comprises maintaining a volume of fuel above a start-ready temperature during a pre-start interval, the pre-start interval beginning after the engine is turned off, beginning automatically, and ending when the engine is restarted, the start-ready temperature greater than a lowest temperature of the engine during the pre-start interval. The method further comprises delivering some of the volume of fuel to the fuel injector when the engine is about to be restarted. Other embodiments of the present disclosure provide more particular methods and systems for providing heated fuel to an engine. According to the various approaches described herein, adequate cold-start fuel atomization may be provided without compromising driver satisfaction due to excessive pre-ignition delay, while at the same time reducing unnecessary heating of fuel during warm engine off conditions. Further, the approaches described herein may be enacted inexpensively in a wide variety of motor-vehicle configurations.

It will be understood that the summary above is provided to introduce in simplified form a selection of concepts that are further described in the detailed description. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
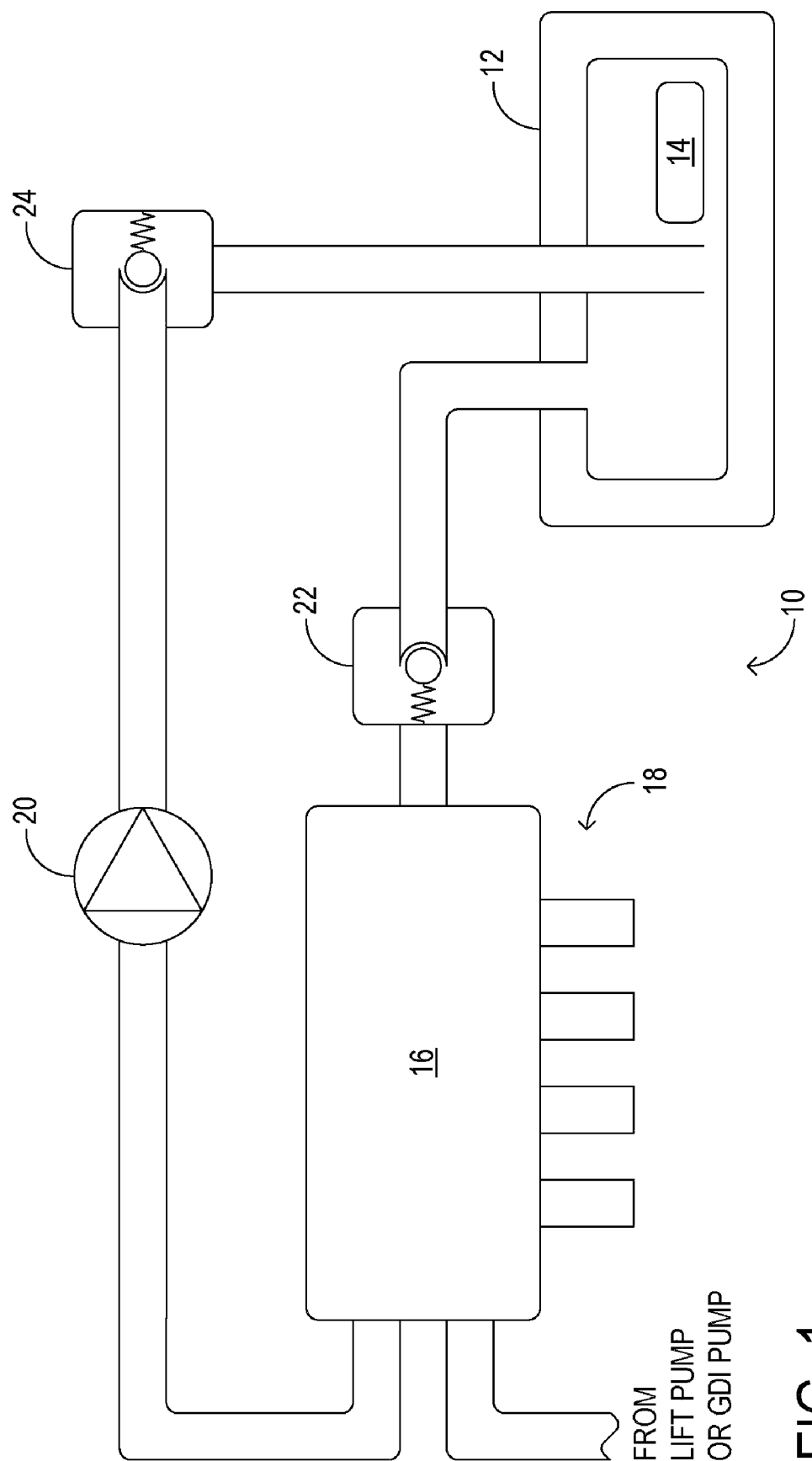
FIG. 1 shows a first example system for providing fuel to an engine of a motor vehicle, in accordance with the present disclosure.

FIG. 1 shows a first example system 10 for providing fuel to an engine of a motor vehicle. More specifically, system 10 is one example of a local, pumped-circulation fuel-delivery system with an added pump. The system includes container 12, which is configured to store a volume of fuel. The container may have any capacity ranging from a few milliliters to several liters. Further, the capacity of the container may be matched to one or more characteristics of the engine and/or the motor vehicle in which the engine is installed. For example, the container may be configured to store sufficient fuel to allow the engine to operate under normal speed and load conditions over a warm-up interval, where the warm-up interval may correspond to the time required for a coolant of the engine to warm from a cold, ambient temperature to a nominal operating temperature.

Container 12 may be configured to store a hydrocarbon fuel (gasoline, diesel fuel, etc.), an alcohol fuel (methanol, ethanol, etc.), and/or a mixture thereof (E15, E85, etc.). Further, the container may be configured to store such fuels at greater-than-ambient temperatures. For, example, the container may be configured to store the hydrocarbon and/or alcohol fuel over a temperature range that includes an ambient temperature and approaches a boiling point of the fuel. Therefore, an interior of container may be fabricated from materials resistant to heated hydrocarbon and/or alcohol fuels.

Container 12 may be insulated to limit a transport of heat through the walls thereof. For example, the container may be wrapped or covered with a thermally insulating material—glass wool, polystyrene foam, etc. The container may include a heat-reflective foil or other coating. In some examples, the container may be a vacuum-enclosing vessel such as a Thermos® or Dewar-type vessel.

FIG. 1 shows heater 14, which is configured to maintain a temperature of the volume of fuel above a start-ready temperature during a pre-start interval. The pre-start interval may be any period of time beginning automatically after the engine is turned off and ending when the engine is restarted. The term 'beginning automatically,' is used herein to indicate that the pre-start interval may begin independent of any action of an operator of the motor vehicle—independent of a driver door opening, independent of an ignition key turning, etc. For example, the pre-start interval may begin when the engine is turned off. In other examples, the pre-start interval may begin some predetermined period of time after the engine is turned off (2 hours after, 30 minutes after, etc.). In still other examples, the pre-start interval may begin when an engine temperature (an engine-component temperature, an engine-coolant temperature, etc.) drops below a threshold temperature; the threshold temperature may be set a few degrees above the start-ready temperature.

The start-ready temperature may be any desirable fuel temperature for the fuel supplied to the engine when the engine is restarted. In one example, the start-ready temperature may be chosen so that the fuel, if supplied at or above the start-ready temperature, may be effectively atomized via a fuel injector of the engine, thereby enabling satisfactory emissions-control and/or cold-start performance. In this example, fuel injected at the start-ready temperature is not cold enough to impair emissions-control performance of the motor vehicle due to inadequate atomization. In another example, the start-ready temperature may be chosen so that the fuel, if supplied to the engine below the start-ready temperature, may not be effectively atomized via a fuel injector of the engine. Therefore, it may be advantageous to supply the fuel at or above the start-ready temperature in order to enable satisfactory emissions-control and/or cold-start performance.

Depending on the motor-vehicle configuration, on ambient conditions, and on the period of time elapsed since the engine was turned off, the start-ready temperature may be greater than a lowest temperature of the engine during the pre-start interval. Therefore, the heater may be configured to supply heat to the volume of fuel in the container during the pre-start interval, either continuously or intermittently. The heat supplied by the heater may be derived from any suitable energy source. For example, the heater may be an electrical resistive heater, deriving energy from an electrical power supply—a plug-in power supply external to the motor vehicle, a battery and/or alternator of the motor vehicle, etc. In other examples, the heater may be a heat exchanger deriving heat energy from the engine or from an exhaust system of the motor vehicle. In still other examples, the heater may be a heat exchanger deriving energy from a solar panel mounted on the motor vehicle.

Although heater 14 is shown in FIG. 1 schematically disposed within container 12, it will be understood from the above examples that the heater may comprise a plurality of components disposed inside as well as outside the container. Further, the heater may be operatively coupled to other motor-vehicle components—an electronic control unit, a temperature sensor, etc.

FIG. 1 shows fuel rail 16 of the engine, which is coupled to a plurality of fuel injectors. Fuel may be supplied to the fuel rail from a fuel-storage tank via a lift pump (not shown in FIG. 1), and provided to a plurality of combustion chambers in the engine via fuel injectors 18. Thus, the engine that is provided fuel in this embodiment may be a GDI engine. In other embodiments, one or more fuel injectors may supply fuel to an intake manifold: thus, the engine may be port-injected as well.

FIG. 1 shows a fuel-handling system coupled to the container and configured to cause the fuel to flow from the container to the fuel rail when the engine is about to be restarted. One or more elements of the fuel-handling system may be triggered by other motor-vehicle components configured to sense when the engine is about to be restarted. Various readily detectable conditions or events may indicate that the engine is about to be restarted: a turning of an ignition key or ignition switch, a depression of a brake pedal when the engine is turned off, an opening of the driver's door from the outside, for example. In one embodiment, an electronic control unit of the motor vehicle may be configured to detect such a condition (or conditions), and in response, trigger the fuel-handling system. As indicated above, heater 14 is configured to maintain the temperature of a volume of fuel at or above the start-ready temperature during the pre-start interval, which extends to the time that the engine is restarted. It follows that the fuel supplied to the fuel rail when the fuel-handling system is triggered may be at or above the start-ready temperature.

In the embodiment illustrated in FIG. 1, the fuel-handling system includes pump 20, which is configured to pump the fuel from fuel rail 16 to container 12 when the engine is about to be restarted. The pump may be configured to move the fuel from the fuel rail to the container faster than the fuel is supplied from the fuel-storage tank or consumed by the engine. Therefore, pumping the fuel from the fuel rail to the container may result in a substantially equivalent counterflow of fuel at or above the start-ready temperature from the container to the fuel rail. In this manner, the fuel-handling system is configured to exchange at least some of the fuel in the container with the fuel in the fuel rail when the engine is about to be restarted.

In the embodiment illustrated in FIG. 1, the fuel-handling system includes one-way pressure-actuated valves 22 and 24, provided to limit convective heat transfer from container 12. Each of the one-way, pressure-actuated valves referred to herein may be any valve configured to transmit fuel in one direction when the pressure across the valve exceeds a threshold pressure, but to block transmission of the fuel when the pressure does not exceed the threshold pressure. Thus, a one-way pressure-actuated valve may transmit fuel in one direction only. Similarly, a check valve is a species of one-way pressure-actuated valve in which the threshold pressure is a small (e.g., small relative to the pressure rating of the valve). In the embodiment illustrated in FIG. 1, one or both of the one-way pressure-actuated valves may be check valves.

It will be understood that FIG. 1 and subsequent drawings are schematic and not intended to represent spatial relationships among system components in any embodiment. Further, the various system components may and will include structure that is not shown in the drawings. In some embodiments, the conduit through which fuel enters container 12 from pump 20 may be at least partly different than the conduit through which fuel exits the container to fuel rail 16. Further, the disposition of the conduits may be determined by the placement of heater 14 and other configurational details. In particular, the conduits may be configured so that colder fuel enters the container from the bottom (via a dip tube, for example), and heated fuel is drawn off from the top.

Figure 2:
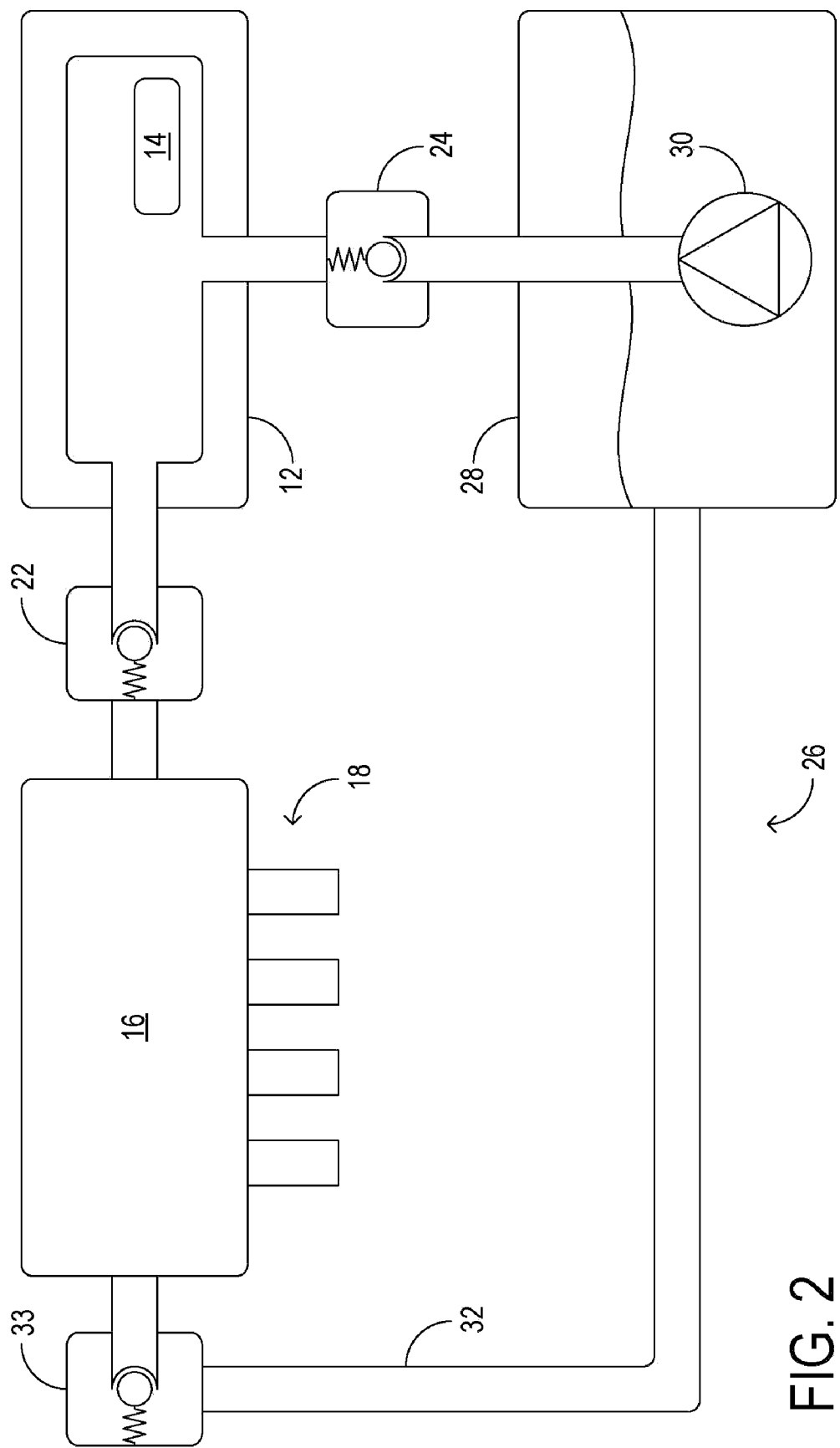
FIG. 2 shows a second example system for providing fuel to an engine of a motor vehicle, in accordance with the present disclosure.

FIG. 2 shows a second example system 26 for providing fuel to an engine of a motor vehicle. More specifically, system 26 is one example of a global, pumped-circulation fuel-delivery system, which uses a conventional lift pump. In this and subsequent embodiments, elements that are substantially the same as in a previous embodiment are rendered, labeled, and named the same as in the previous embodiment, and are described no further. In will be understood, however, that identically named elements in different embodiments of the present disclosure may be at least partly different. Likewise, functional aspects of this and subsequent embodiments, if substantially the same as in a previous embodiment, are presented with a minimum of functional description.

FIG. 2 shows a fuel-storage tank 28 and associated lift pump 30. In this embodiment, the fuel-storage tank is configured to receive fuel from fuel rail 16, and the lift pump is configured to pump the fuel from the fuel-storage tank to container 12 when the engine is about to be restarted. Fuel at or above the start-ready temperature, thereby displaced from the container, is forced into the fuel rail and supplied to the plurality of fuel injectors 18; unused fuel from the fuel rail may re-enter the fuel-storage tank via return path 32. In this manner, fuel entering the container forces fuel maintained above the start-ready temperature into the fuel rail, which forces fuel from the fuel rail into the fuel-storage tank when the engine is about to be restarted.

In the embodiment illustrated in FIG. 2, the return path includes an additional one-way, pressure-activated valve 33. This valve is configured to maintain pressurization in the fuel rail while permitting fuel to return to the fuel-storage tank. In another embodiment, a regulator may be used in place of one-way, pressure-activated valve 33.

In various embodiments, lift pump 30 may be configured to move the fuel not only when the engine is about to be restarted, but during other periods as well. In one example, the pump may be configured to pump the fuel whenever the engine is operating in addition to when the engine is about to be restarted. However, by activating the pump at least when the engine is about to be restarted, a volume of fuel substantially at or above the start-ready temperature may be provided to the plurality of fuel injectors 18 when the engine is restarted.

Figure 3:
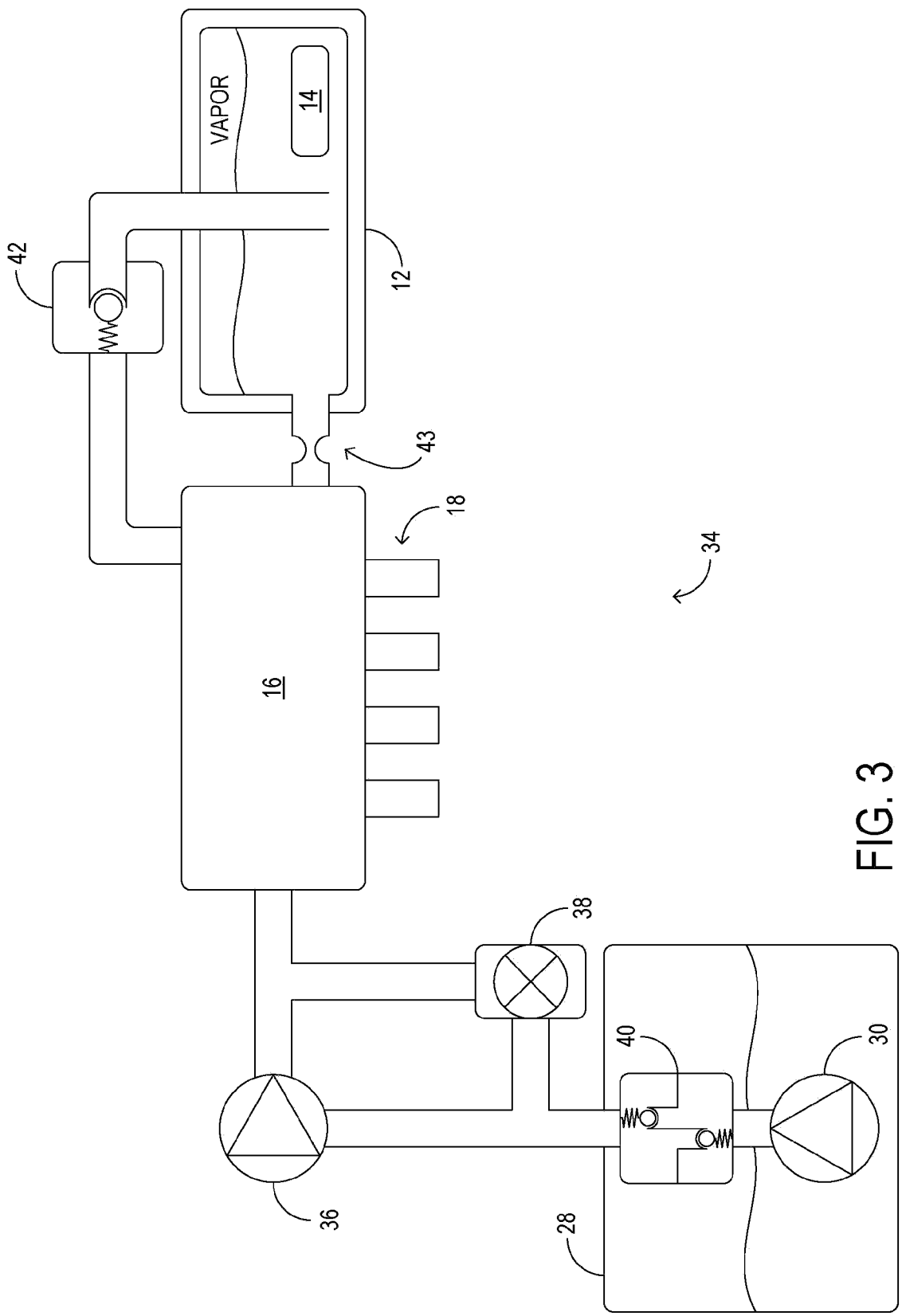
FIG. 3 shows a third example system for providing fuel to an engine of a motor vehicle, in accordance with the present disclosure.

FIG. 3 shows a third example system 34 for providing fuel to an engine of a motor vehicle. More specifically, system 34 is one example of a vapor push-out system having no extra pumps. Subsequent embodiments (vide infra) show other such examples. In this embodiment, the fuel-handling system includes lift pump 30 configured to draw fuel from fuel-storage tank 28, GDI pump 36 configured to supply the fuel to fuel rail 16, and a normally closed valve 38 configured to admit fuel from the fuel rail to the fuel-storage tank when the engine is about to be restarted. In this embodiment, the GDI pump and the normally closed valve are disposed in parallel and coupled to an outlet of the lift pump via two-way pressure-actuated valve 40. A two-way pressure-actuated valve may be any valve that is a functional equivalent of two one-way pressure-actuated valves disposed in parallel, with the inlet of each valve coupled to the outlet of the other valve. A two-way pressure-actuated valve may admit of a threshold pressure for flow in one direction that differs from the threshold pressure for flow in the opposite direction.

Continuing in FIG. 3, normally closed valve 38 may be directly or indirectly controllable via an electronic control unit of the motor vehicle; it may be a hydraulically or electrically actuated valve—a solenoid-actuated valve, for example. In this embodiment, opening normally closed valve 38 allows cold fuel from fuel rail 16 to be flushed into fuel-storage tank 28 by the pressurized fuel in container 12. Therefore, two-way pressure-actuated valve 40 may have a threshold pressure for return of fuel to the fuel tank which is on the order of the vapor pressure of the fuel at the start-ready temperature.

In this embodiment, the vapor pressure of the heated fuel in container 12 is the motive force used to push the heated fuel into fuel rail 16. In other words, vapor pressure of fuel maintained above the start-ready temperature pushes the fuel from the container to the fuel rail, and from the fuel rail to the fuel-storage tank, when the engine is about to be restarted. In moving from the container to the fuel rail, the heated fuel passes through one-way, pressure activated valve 42, which is configured to provide relatively little restriction to the flow of fuel in the indicated direction. In other, similar embodiments, a float-actuated valve may be used to stop heated fuel from exiting the container once the level has dropped to a near-empty position. This aspect relieves the control system from the task of estimating how much fuel is pushed out when normally closed valve 38 is opened.

In this and similar embodiments, the capacity of container 12 may be greater than that of fuel rail 16 so that the fuel rail may be purged multiple times prior to engine start, for increased heating efficacy. Further, GDI pump 36 may include an integrated outlet check valve. Other, similar embodiments may include a pressure-relief valve for container 12, to prevent the pressure inside the container from exceeding the ratings of various components. In the embodiment of FIG. 3, normally closed valve 38 may be used for pressure relief at fuel rail 16, to control fuel injector leakage, etc. Further, in embodiments where a pressurized gaseous fuel is available, the pressure of the gaseous fuel may be used to exchange the cold fuel for the heated fuel.

After the heated volume of fuel is discharged from container 12, fuel from the fuel rail may refill the container via orifice 43. The restriction in the orifice is configured to control the refill rate and allow fuel rail 16 to be pressurized by GDI pump 36 before the container is filled. Further, the heater may be operatively coupled to other motor-vehicle components—an electronic control unit, a temperature sensor, etc.

Figure 4:
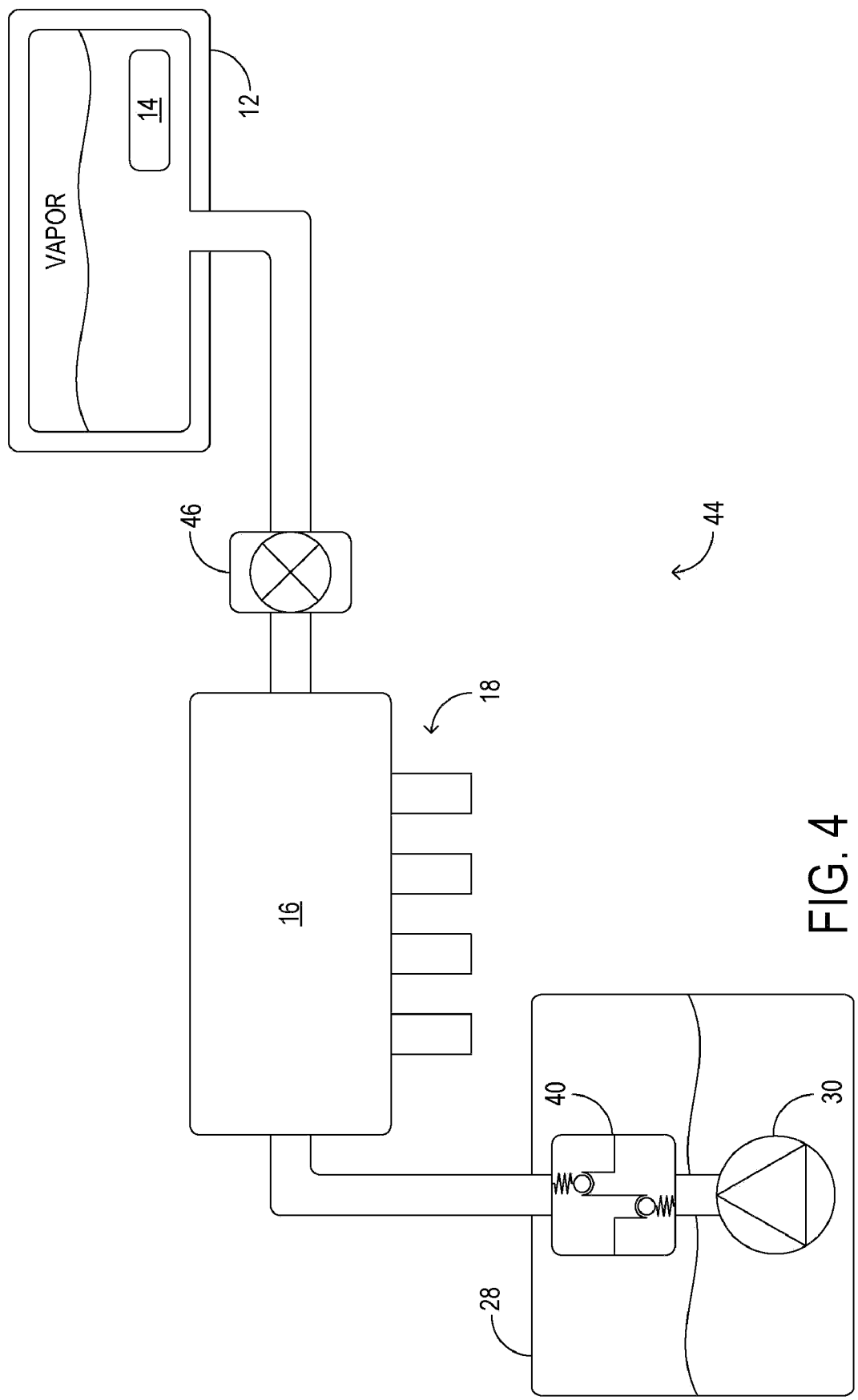
FIG. 4 shows a fourth example system for providing fuel to an engine of a motor vehicle, in accordance with the present disclosure.

FIG. 4 shows a fourth example system 44 for providing fuel to an engine of a motor vehicle. This embodiment does not include a GDI pump; it may be appropriate for a port-injection engine, for example. In other respects, this embodiment is similar to the previous embodiment. The fuel-handling system in FIG. 4 includes lift pump 30 configured to draw fuel from fuel-storage tank 28, and normally closed valve 46 configured to admit fuel from container 12 to fuel rail 16 when the engine is about to be restarted. Opening normally closed valve 46 allows cold fuel from fuel rail 16 to be flushed into fuel-storage tank 28 by the pressurized fuel in container 12.

The embodiment illustrated in FIG. 4 shows a single conduit linking container 12 to normally closed valve 46. In other embodiments, however, the fuel may pass into the container via a restrictive orifice, and out of the container via a one-way, pressure activated valve presenting relatively little restriction to the flow, as shown in FIG. 3. Refilling is controlled such that it does not drop pressure in the rail precipitously during engine operation.

Figure 5:
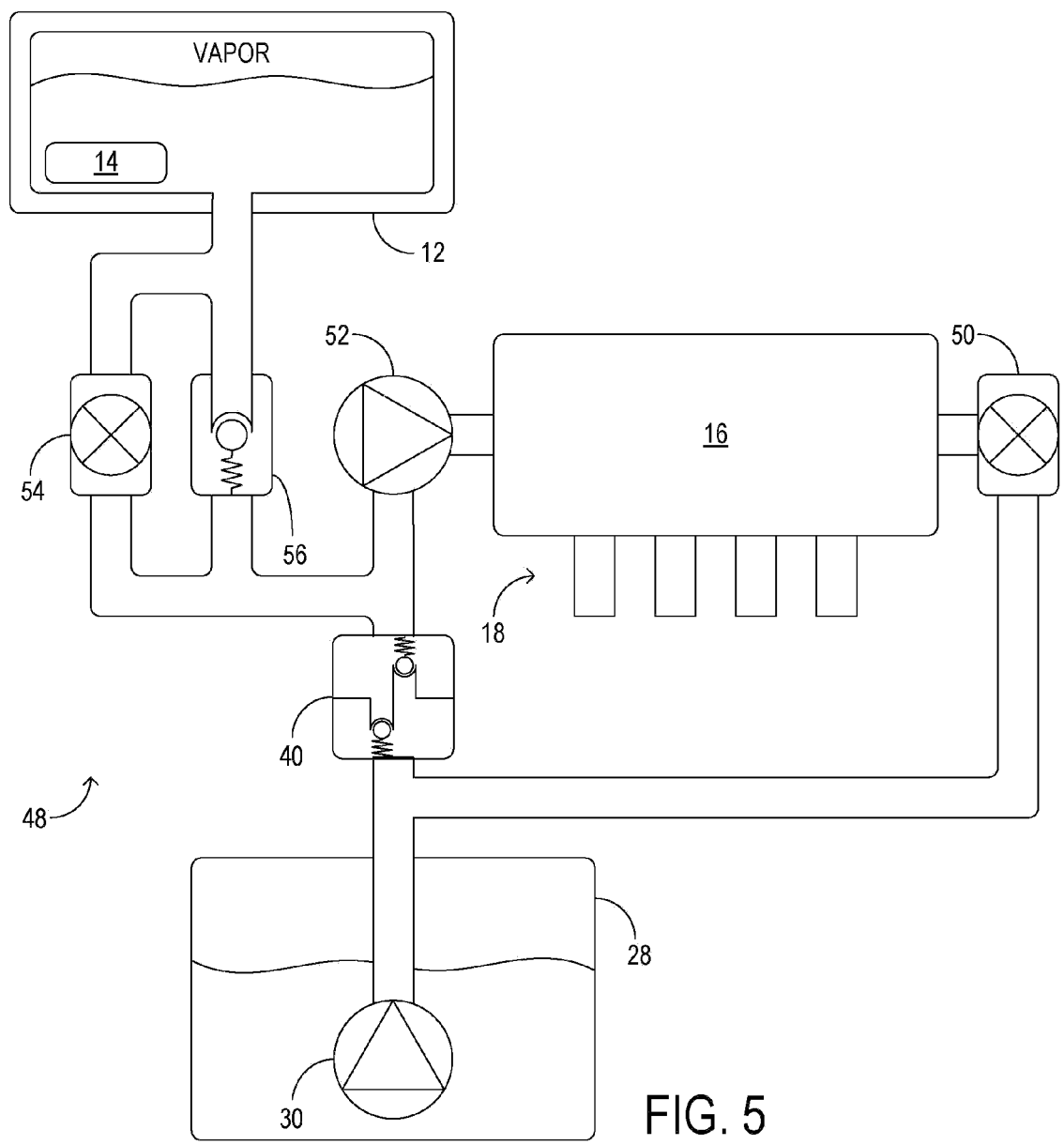
FIG. 5 shows a fifth example system for providing fuel to an engine of a motor vehicle, in accordance with the present disclosure.

FIG. 5 shows a fifth example system 48 for providing fuel to an engine of a motor vehicle. The fuel-handling system in FIG. 5 includes lift pump 30 configured to draw fuel from fuel-storage tank 28, first normally closed valve 50 configured to admit fuel from fuel rail 16 to fuel-storage tank 28 when the engine is about to be restarted, GDI pump 52 configured to supply fuel to the fuel rail, two-way pressure-actuated valve 40 disposed between the lift pump and the GDI pump, second normally closed valve 54 configured to admit the fuel from the container to the GDI pump when the engine is about to be restarted, and one-way, pressure-actuated valve 56, also known as a 'pressure-relief valve,' disposed parallel to the second normally closed valve and configured to release the fuel from container 12 when the container is over-pressurized.

In this and other embodiments, GDI pump 52 may include integrated components not shown in the drawing: an outlet check valve, a pressure-relief valve, and a controllable inlet check valve, as examples. In the embodiment illustrated in FIG. 5, container 12 is disposed on the low pressure side of GDI pump 52. This configuration provides for minimal injector leak at key-off because the fuel rail pressure can remain low while the heated fuel is at or above its vapor pressure. Normally closed valves 50 and 54 may be actuated as described in the previous embodiment, when the engine is about to be restarted. In addition, second normally closed valve 54 may be actuated when the container is refilled.

In the embodiment illustrated in FIG. 5, cold fuel from the fuel rail is returned to a point that is downstream of lift pump 30 but downstream of two-way, pressure-activated valve 40 (relative to the normal fuel supply flow). In other embodiments, the conduit that returns the fuel may be plumbed to the other side of the two-way, pressure activated valve for reduced fuel-handling system cost.

Figure 6:
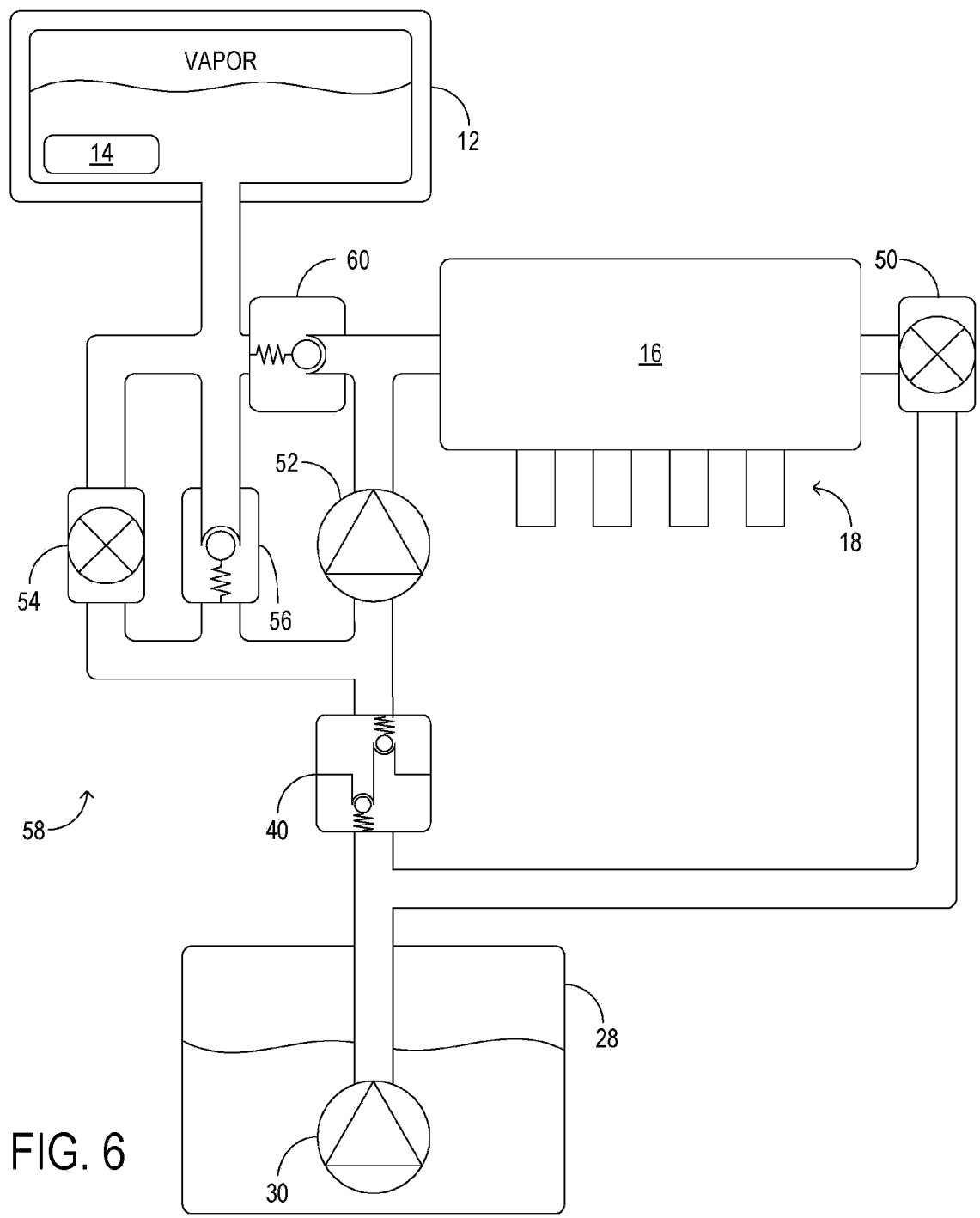
FIG. 6 shows a sixth example system for providing fuel to an engine of a motor vehicle, in accordance with the present disclosure.

FIG. 6 shows a sixth example system 58 for providing fuel to an engine of a motor vehicle. In this embodiment, the fuel-handling system is similar to that of the previous embodiment, but further includes a second one-way pressure-actuated valve 60 configured to admit the fuel from the fuel rail 16 to container 12 when the fuel rail is over-pressurized.

Normally closed valves 50 and 54 are actuated as described in the previous embodiment. One-way pressure-actuated valve 56 may be configured as a pressure-relief valve. In this embodiment, one-way pressure-actuated valve 60 is configured to control the refilling of container 12. As such, it may have a relatively high threshold pressure, e.g., 300 p.s.i. to open. Further, GDI pump 52 may include integrated components as described in the previous embodiment. As in the previous embodiment, container 12 is disposed on the low-pressure side of the GDI pump. In this and other embodiments, the pressure in the fuel rail may be driven to a default pressure even in the event that a fuel rail pressure sensor should fail.

Figure 7:
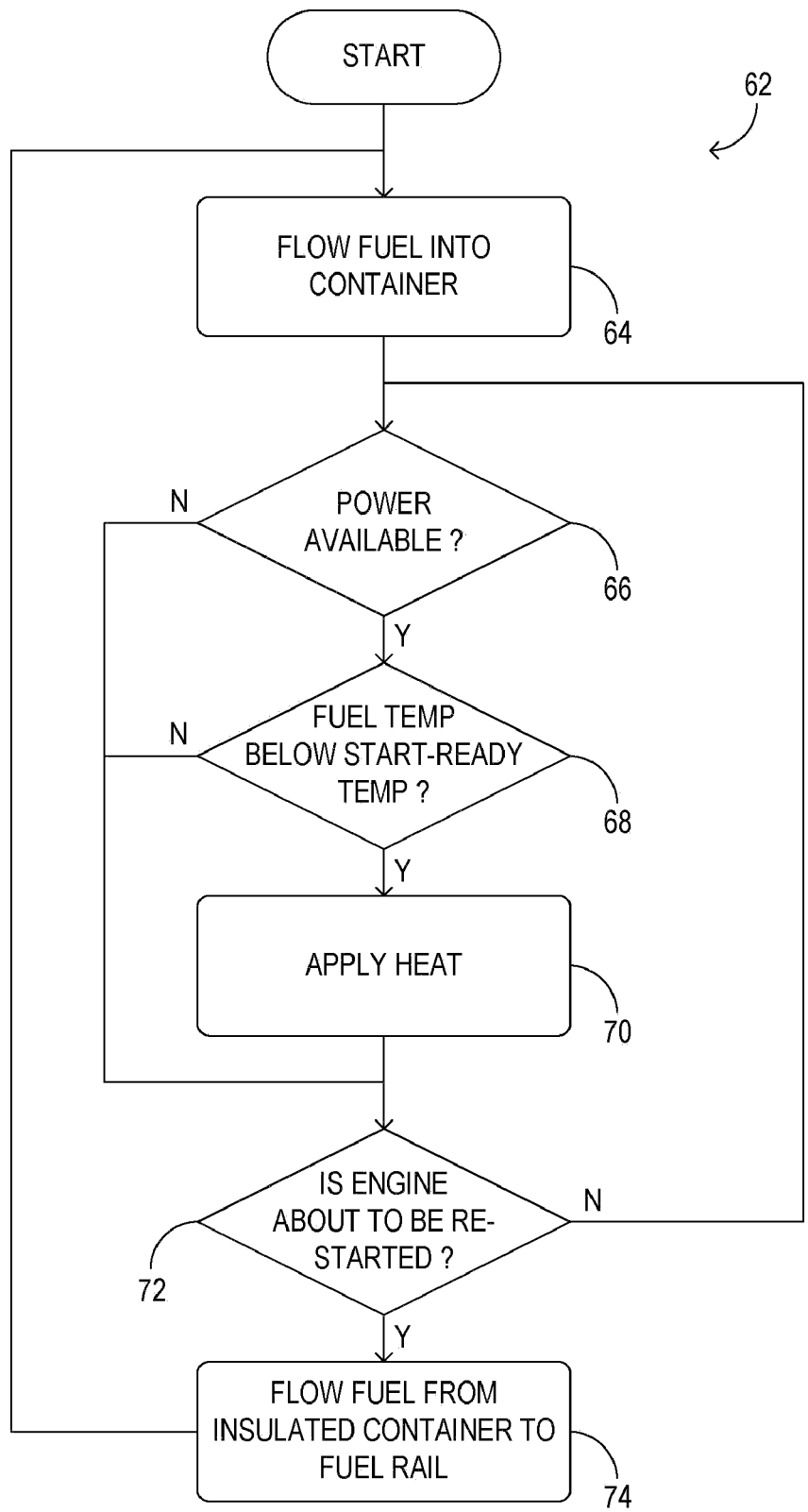
FIG. 7 illustrates an example method for providing fuel to an engine of a motor vehicle, in accordance with the present disclosure.

FIG. 7 shows an example method 62 for providing heated fuel to an engine. The method may be enabled via one or more of the embodiments described herein. Therefore, continued reference is made to various aspects of the embodiments. It will be understood, however, that the method may be enabled by other configurations as well.

The method begins at 64, where fuel is flowed into a container, e.g. container 12. The fuel may be flowed into the container via a fuel-handling system substantially as set forth above. The method continues to 66, where it is determined whether power for heating the fuel inside the container is available. The availability of power may be assessed in a variety of different ways, depending on the particular configuration in use. It may include, for example, measuring a battery voltage, measuring an engine coolant temperature, a temperature of fluid in a heat exchanger, etc.

If power for heating the fuel inside the container is available, then at 68, it is determined whether the temperature of the fuel in the container is above or below the start-ready temperature. In some examples, the temperature of the fuel may be measured directly, as with a thermocouple or other temperature sensor operatively coupled to an electronic control unit of the motor vehicle. If the fuel in the container is below the start-ready temperature, then at 70, heat is applied to the fuel in the container. Heat may be applied in any manner set forth in the example configurations herein, or in any other suitable manner. In this way, a volume of fuel may be maintained above a start-ready temperature during a pre-start interval, the pre-start interval beginning automatically after the engine is turned off and ending when the engine is restarted. Further, the start-ready temperature may be greater than a lowest temperature of the engine during the pre-start interval.

Execution of method 62 continues at 72, where it is determined whether the engine is about to be restarted. The determination of whether the engine is about to be restarted may be based on a trigger from an ignition system of the motor vehicle, as described above, or based on a driver-side door opening from the outside, etc. If it is determined that the engine is not about to be restarted, then execution resumes at 66. However, if it is determined that the engine is about to restarted, then at 74, fuel from the insulated container is flowed into the fuel rail of the engine, and the method returns to 64. The fuel may be flowed into the fuel rail via a fuel-handling system as described above in various example embodiments. In this manner, a volume of heated fuel may be delivered to the engine when the engine is restarted.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a control system. It will be understood that some of the process steps described and/or illustrated herein may in some embodiments be omitted without departing from the scope of this disclosure.

Thus, a particularly simple method for providing heated fuel to a fuel injector of an engine, which is fully consistent with this disclosure, includes, at least under selected conditions, heating the fuel to above a temperature of the engine prior to any indication from the driver that the engine is about to be restarted, and delivering some of the fuel maintained above the start-ready temperature to the fuel injector when the driver restarts the engine.

Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for providing heated fuel to a fuel injector of an engine in a motor vehicle, the method comprising:
    maintaining a volume of fuel above a start-ready temperature during a pre-start interval, the pre-start interval beginning after the engine is turned off, beginning automatically, and ending when the engine is restarted, the start-ready temperature greater than a lowest temperature of the engine during the pre-start interval, the automatic beginning of the maintaining of the volume of fuel above the start-ready temperature beginning independent of action of an operator of the motor vehicle, the fuel maintained above the start-ready temperature being stored in a container, where fuel is pumped into the container from a fuel rail; and delivering some of the volume of fuel maintained above the start-ready temperature to the fuel injector when the engine is about to be restarted.

2. The method of claim 1, wherein the pre-start interval begins when the engine is turned off.

3. The method of claim 1, wherein fuel injected at the start-ready temperature is not cold enough to impair emissions-control performance of the motor vehicle due to inadequate atomization.

4. The method of claim 1, wherein maintaining the volume of fuel above the start-ready temperature includes heating the fuel.

5. The method of claim 1, wherein maintaining the volume of fuel above the start-ready temperature further includes heating the fuel only if power is available to heat the fuel.

6. The method of claim 1, wherein delivering some of the volume of fuel to the fuel injector is triggered by actuating an ignition switch of the motor vehicle or opening a driver's door of the motor vehicle.

7. A method for providing heated fuel to an engine fuel injector of a vehicle operated by a driver comprising:
   in response to temperature dropping below a threshold, automatically heating fuel in a container to above engine temperature prior to any driver starting indication and independent of operator action, the fuel pumped into the container from a fuel rail coupled to the injector; and
   delivering the heated fuel to the injector to restart the engine.

8. The method of claim 7 further comprising delivering fuel from the container to the fuel rail via a pressure-actuated valve.

9. The method of claim 7, further comprising delivering fuel to the container via a pressure-actuated valve.

10. The method of claim 7, further pumping the fuel from the fuel rail to the container when the engine is about to be restarted.

11. The method of claim 10, further comprising exchanging fuel in the container with fuel in the fuel rail when the engine is about to be restarted.

12. The method of claim 10, wherein fuel entering the container forces fuel maintained above the start-ready temperature into the fuel rail, which forces fuel from the fuel rail into a fuel-storage tank when the engine is about to be restarted.

13. A method for providing fuel to an engine of a vehicle, the vehicle including a fuel injector, a container configured to store fuel, a heater, a fuel-handling system coupled to the container, the fuel-handling system including a lift pump and a GDI fuel pump, and a fuel-storage tank, comprising;
   maintaining, via the heater, a temperature of the fuel above a start-ready temperature during a pre-start interval, the pre-start interval beginning after the engine is turned off, beginning automatically, and ending when the engine is restarted, the start-ready temperature greater than a lowest temperature of the engine during the pre-start interval;
   flowing, via the fuel-handling system, fuel from the container to the fuel injector when the engine is about to be restarted;
   drawing fuel from the fuel-storage tank via the lift pump;
   admitting fuel from a fuel rail of the engine to the fuel-storage tank when the engine is about to be restarted via a first normally closed valve configured;
   supplying fuel to the fuel rail via the GDI pump;
   admitting fuel from the container to the GDI pump via a second normally closed valve when the engine is about to be restarted; and
   releasing fuel from the container via a one-way, pressure-actuated valve disposed parallel to the second normally closed valve.

* * * * *